(12) United States Patent
De Clercq

(10) Patent No.: US 11,165,357 B2
(45) Date of Patent: Nov. 2, 2021

(54) CONTROL GEAR FOR AN ELECTRICAL LOAD AND METHOD

(71) Applicant: TRIDONIC GMBH & CO KG, Dornbirn (AT)

(72) Inventor: Ludwig Erasmus De Clercq, Dornbirn (AT)

(73) Assignee: Tridonic GmbH & Co KG, Dornbirn (AT)

( * ) Notice: Subject to any disclaimer, the term of this patent is extended or adjusted under 35 U.S.C. 154(b) by 12 days.

(21) Appl. No.: 16/646,704

(22) PCT Filed: Sep. 11, 2018

(86) PCT No.: PCT/EP2018/074367
§ 371 (c)(1),
(2) Date: Mar. 12, 2020

(87) PCT Pub. No.: WO2019/052974
PCT Pub. Date: Mar. 21, 2019

(65) Prior Publication Data
US 2020/0412262 A1 Dec. 31, 2020

(30) Foreign Application Priority Data

Sep. 13, 2017 (DE) .................. 10 2017 216 183.3
Mar. 29, 2018 (DE) .................. 10 2018 204 891.6

(51) Int. Cl.
*H02M 3/335* (2006.01)
*H02M 1/088* (2006.01)
(Continued)

(52) U.S. Cl.
CPC ....... *H02M 3/33576* (2013.01); *H02M 1/088* (2013.01); *H05B 45/335* (2020.01);
(Continued)

(58) Field of Classification Search
CPC ............. H02M 3/335; H02M 3/33576; H02M 3/33592; H02M 1/088; H05B 45/385;
(Continued)

(56) References Cited

U.S. PATENT DOCUMENTS 5,768,118 A * 6/1998 Faulk .................. H02M 1/44
323/288
2010/0110732 A1 5/2010 Moyer et al.
(Continued)

FOREIGN PATENT DOCUMENTS

DE 10 2015 114 036 2/2016
DE 10 2016 122 161 5/2018

OTHER PUBLICATIONS

PCT Search Report dated Oct. 25, 2018 in parent PCT application PCT/EP2018/074367.
(Continued)

*Primary Examiner* — Gary L Laxton
(74) *Attorney, Agent, or Firm* — Andrus Intellectual Property Law

(57) ABSTRACT

The aim of the invention, as demonstrated in various examples, is to control a current flow to an electrical load, e.g. a light emitting diode, in a particularly precise manner. For this purpose, control gear (90) comprising a DC-DC switching controller (100) is used in various examples.

19 Claims, 11 Drawing Sheets

(51) Int. Cl.
  *H05B 45/3725* (2020.01)
  *H05B 45/335* (2020.01)
  *H05B 45/385* (2020.01)
  *H05B 45/12* (2020.01)
  *H05B 45/375* (2020.01)

(52) U.S. Cl.
  CPC ....... *H05B 45/3725* (2020.01); *H05B 45/385* (2020.01); *H05B 45/12* (2020.01); *H05B 45/375* (2020.01)

(58) Field of Classification Search
  CPC .............. H05B 45/335; H05B 45/3725; H05B 45/375; H05B 45/12
  See application file for complete search history.

(56) References Cited

U.S. PATENT DOCUMENTS

| | | | |
|---|---|---|---|
| 2013/0088894 A1* | 4/2013 | Rozman | H02M 1/32 363/15 |
| 2016/0128160 A1 | 5/2016 | Patil et al. | |
| 2019/0267905 A1 | 8/2019 | De Clercq et al. | |

OTHER PUBLICATIONS

German Search Report dated Sep. 16, 2019 in German priority application 10 2018 204 891.6.

\* cited by examiner

CONTROL GEAR FOR AN ELECTRICAL LOAD AND METHOD

CROSS REFERENCE TO RELATED APPLICATIONS

The present application is the U.S. national stage application of international application PCT/EP2018/074367 filed Sep. 11, 2018, which international application was published on Mar. 21, 2019 as International Publication WO 2019/052974 A1. The international application claims priority to German Patent Applications 10 2017 216 183.3 filed Sep. 13, 2017 and 10 2018 204 891.6 filed Mar. 29, 2018.

TECHNICAL FIELD

Various examples of the invention relate to control gear for an electrical load, such as a light-emitting diode. Various examples of the invention relate in particular to the operation of one or more switches of a DC-DC switching controller of the control gear.

BACKGROUND

For the brightness control of illuminants, controlling the time-averaged or average current flow to an illuminant, for example a light-emitting diode, along with a corresponding voltage can be provided. Switching controllers can be used for this purpose. Examples of switching controllers include buck converters and flyback converters.

With such switching controllers, a switch is provided which controls the charging and discharging of an energy store, for example a coil. For example, implementing, by means of the switching controller and a controller, a control loop which implements dimmer functionality is known from DE 10 2015 203 249 A1. In this case, the average current flow to the illuminant can be regulated as a function of a reference variable, which in turn is determined on the basis of a dimmer level.

In various applications, it may be desirable to control the brightness of the illuminant with particular precision, i.e., to adjust the brightness in good agreement with the dimmer level. Flickering of the illuminant due to low switching frequencies of the switching controller should typically also be avoided. On the other hand, high switching frequencies of the switching controller can cause comparatively high losses so that energy efficiency suffers.

BRIEF SUMMARY OF THE INVENTION

There is a need for improved techniques for controlling current flow.

This object is achieved by the features of the independent claims. The features of the dependent claims define embodiments.

In one example, a control gear for an electrical load comprises a DC-DC flyback converter with a transformer. The DC-DC flyback converter also comprises a first switch arranged on a primary side of the transformer. The DC-DC flyback converter also comprises a second switch. The second switch is arranged on a secondary side of the transformer. The control gear also comprises a controller. The controller is configured to switch the second switch based on a manipulated variable of a control loop. Here, the manipulated variable comprises a time duration for which the second switch is operated in a conductive state.

A method for controlling a DC-DC flyback converter having a transformer, a first switch arranged on a primary side of the transformer, and a second switch arranged on a secondary side of the transformer, comprises: switching the second switch based on a manipulated variable of a control loop. In this case, the manipulated variable comprises a time duration for which the second switch is operated in a conductive state.

A control gear for an electrical load comprises a DC-DC switching controller. The DC-DC switching controller has a first switch, a second switch, and an energy store. The control gear also comprises a controller. The controller is configured to operate, in a first phase the first switch in a conductive state and the second switch in a non-conductive state. The controller is further configured to operate, in a second phase, the first switch in the non-conductive state and the second switch in the conductive state. The controller is further configured to operate, in a third phase, the first switch in the non-conductive state and the second switch in the non-conductive state.

For example, the first switch could control the charging of the energy store, while the second switch could control discharging of the energy store to the load.

A method for controlling a DC-DC switching controller having a first switch, a second switch, and an energy store comprises: in a first phase, operating the first switch in a conductive state and operating the second switch in a non-conductive state; in a second phase, operating the first switch in the non-conductive state and operating the second switch in the conductive state; and also in a third phase: operating the first switch in the non-conductive state and operating the second switch in the non-conductive state.

A method of operating a DC-DC switching controller comprises driving the DC-DC switching controller in a hybrid mode, which is a mixture of a continuous mode and a discontinuous mode.

The features set forth above and the features described below may be used not only in the corresponding explicitly stated combinations but also in further combinations or in isolation without departing from the scope of the present invention.

DETAILED DESCRIPTION OF EMBODIMENTS

Figure 1:
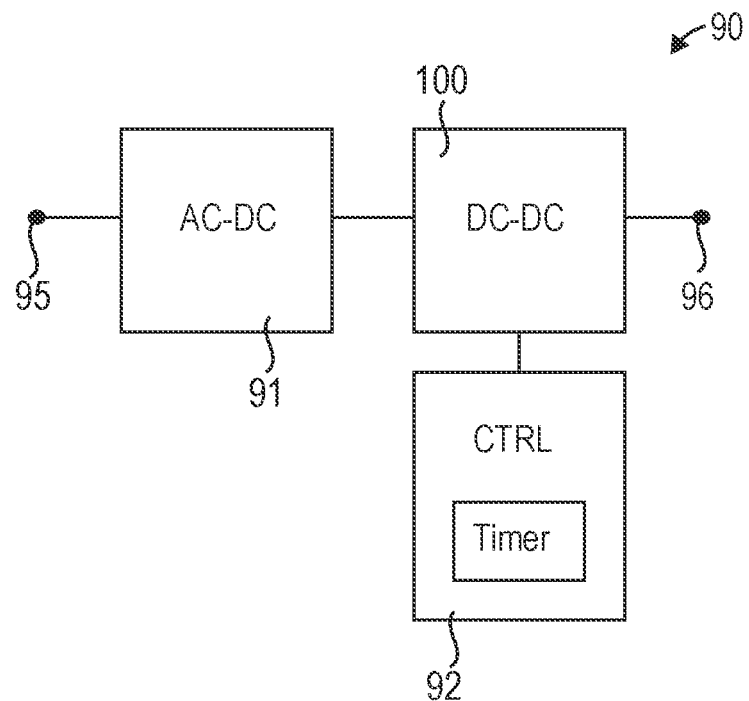
FIG. 1 illustrates schematically a control gear having a controller and a switching controller according to various examples.

The above-described properties, features and advantages of this invention, along with the manner in which they are achieved, will be clearer and more clearly understood by reference to the following description of the exemplary embodiments discussed in more detail in connection with the drawings.

The present invention will be explained in more detail below based on preferred embodiments with reference to the drawings. In the figures, like reference signs designate like or similar elements. The figures are schematic representations of various embodiments of the invention. Elements illustrated in the figures are not necessarily drawn to scale. The various elements shown in the figures are rather reproduced in such a way that their function and general purpose will be understood by the person skilled in the art. Connections and couplings between functional units and elements illustrated in the figures may also be implemented as indirect connection or coupling. A connection or coupling can be implemented by wire or wirelessly. Functional units may be implemented as hardware, software, or a combination of hardware and software.

In the following, techniques are described for operating an electrical load by means of a control gear. The techniques described herein may be used in control gear for illuminants; in such cases, the illuminant, for example a light-emitting diode, forms the load. However, while reference is primarily made below to such an application in control gear for illuminants, the techniques described herein may also be applied in operation for other types of loads.

In the examples described herein, DC-DC switching controllers (hereinafter referred to for short as switching controllers) are used to operate the light-emitting diode. Such switching controllers have one or more switches, for example implemented by semiconductor transistors, along with an energy store. Examples of switching controllers include transducers with and without potential isolation. Examples include buck converters, flyback converters, buck-boost converters, and boost converters.

Typically, the at least one switch of the switching controller is switched back and forth cyclically between a conductive state and a non-conductive state. The voltage and the current flow to the load can be controlled by a duty factor of the cyclic switching back and forth. In general, the cycle by which the at least one switched switching controller is switched can have a plurality of phases which are passed through iteratively and cyclically; in this case, different phases can differ in that the at least one switch is operated in different states depending on the phase. For example, a first switch could be operated in a conductive state in a first phase, while a second switch is operated in a non-conductive state in the first phase; then, the first switch could be operated in the non-conductive state in a second phase, while the second switch is operated in the conductive state in the second phase.

Here, the operation of the at least one switch can be controlled, for example based on a manipulated variable of a control loop. This means that the at least one switch can be selectively switched back and forth between a conductive state (or ON state or closed state) and a non-conductive state (or OFF state or open state). The average current flow to the light-emitting diode can be controlled thereby. One or more controlled variables and manipulated variables of the control loop which are indicative of the average current flow to the light-emitting diode can be taken into account in this context.

In some examples, it is possible to monitor the average current flow to the light-emitting diode in a particularly precise manner. This can be done by detecting a measurement signal which is indicative of the current flow to the light-emitting diode, wherein the measurement signal is detected by a measuring circuit which is arranged adjacent to a load-side output connection of the switching controller. This means in particular that the measuring circuit is arranged between the output connection and the at least one switch of the switching controller. For example, in a flyback converter, the measuring circuit can be arranged on the secondary side of a transformer of the measuring circuit. The influence of the manipulated variable on the average current flow to the light-emitting diode can thereby be monitored with particular accuracy. In other examples, however, the measuring circuit measuring the current flow to the load could also be arranged further away from the output connection, for example on the primary side of the transformer in the case of a flyback converter.

The techniques described herein make it possible to control the average current flow to the load with particular precision and, for example, in particular to regulate it precisely. In particular, a control loop can be implemented by the switching controller and a controller of the control gear, which control loop takes into account at least one variable indicative of the average current flow to the load as controlled variable. This means that the average current flow to the load can be adjusted in a precise and monitored manner by the control loop, for example in relation to a reference variable. Temporal drift, for example due to temperature fluctuations or to aging of the light-emitting diode, can be taken into account within the context of disturbance variables.

The brightness of light-emitting diodes depends on the average current flow with which the light-emitting diodes are operated. By controlling the average current flow to the load by means of the control loop, the techniques described herein make it possible for the brightness of light-emitting diodes to be adjusted in a precise and monitored manner. Dimmer functionality can thus be implemented, for example.

Various examples are based on the finding that, by suitable control of the operation of the at least one switch, the current flow to the load can be adjusted with particular precision. At the same time, by means of various examples described herein, it may be possible to avoid particularly low switching frequencies, which typically cause flickering of the light-emitting diode. On the other hand, by means of various examples described herein, it may be possible to avoid particularly high switching frequencies, which typically cause a large power loss due to the frequent switching operations. Various examples described herein allow a In one example, a flyback converter, which has a transformer, a first switch, and also a second switch, is used for this purpose. In this case, the first switch is arranged on a primary side of the transformer, that is to say, for example, turned toward a mains supply or a DC bus system. The second switch is arranged on the secondary side of the transformer, that is to say nearer to the light-emitting diode to be supplied than the first switch. A controller is configured here to switch at least the second switch of the flyback converter based on the manipulated variable of a control loop. In this case, the manipulated variable of the control loop can comprise a time duration for which the second switch is operated in the conductive state, sometimes also referred to as a low-impedance state or ON state. This can therefore mean that a regulation, for example to a desired average current flow to the light-emitting diode, is achieved by selectively controlling the second switch in the time duration.

In particular, compared to reference implementations, in which the second switch is controlled as a function of a manipulated variable that defines a current flow through the flyback converter to the load, an increased precision of the regulation implemented by the control loop can be achieved in this way. In particular, quantization noise from comparators, which are typically used in connection with such reference implementations, can be prevented by the controller within the time duration.

In a further example, a switching controller with a first switch and a second switch and also with an energy store is suitably controlled by a controller. In particular, the controller may be configured to drive the DC-DC switching controller in accordance with a first phase, a second phase, and a third phase. In the first phase, the first switch is operated in a conductive state and the second switch is operated in a non-conductive state. In the second phase, the first switch is then operated in the non-conductive state, while the second switch is operated in the conductive state. In the third phase, both the first switch and the second switch are lastly operated in the non-conductive state.

For example, the first phase, the second phase, and the third phase may be passed through iteratively and cyclically in accordance with one cycle. In the first phase, the energy store of the DC-DC switching controller can then be charged by a mains connection or generally by a supply line, while the energy store is discharged in the second phase that follows. The third phase can be used for the fine adjustment of the average current flow to the light-emitting diode.

By providing the third phase, it can be achieved, in particular, that comparatively small average current flows through the DC-DC switching controller to the light-emitting diode can also be implemented; this is because no particularly large current flows typically occur during the third phase. For this reason, the time average of the current flow also drops over an iteration of the cycle, which corresponds to the average current flow to the light-emitting diode.

FIG. 1 illustrates aspects with regard to a control gear 90 that may benefit from techniques described herein. The control gear 90 comprises a mains connection 95. The control gear 90 is configured to receive a mains voltage via the mains connection 95. The mains voltage may be an AC voltage having an amplitude in the range of 100 V to 300 V.

The control gear 90 also comprises an AC-DC converter 91. The AC-DC converter 91 is configured to convert the mains voltage into a DC signal. For example, the AC-DC converter could have a bridge rectifier, one or more smoothing filters, etc.

Whereas, in FIG. 1, the control gear receives an AC voltage, the control gear could also receive a DC voltage, for example from a DC bus system (DC string), in other implementations.

The control gear 90 also comprises a switching controller 100 configured to receive the DC signal from the AC-DC converter 91 via an input connection 101. The DC signal has a certain voltage amplitude. The switching controller 100 is configured to output a further DC signal via an output connection 96 to a light-emitting diode (not shown in FIG. 1), wherein the further DC signal has a voltage amplitude that is different from the voltage amplitude of the DC signal at the input 101 of the switching controller 100. The switching controller also influences the current flow to the light-emitting diode.

In addition, the control gear 90 also comprises a controller 92. The controller 92 could be implemented, for example, by a microcontroller or a field-programmable array (FPGA). The controller 92 may be implemented as hardware and/or software.

The controller 92 implements dimmer functionality. This means that, based on a dimmer signal 93, the controller 92 controls the operation of the switching controller 100 in a regulated manner. The dimmer signal 93 may indicate a brightness request from a user.

The controller could, for example, comprise a timer. The timer may provide a timer signal on the basis of which one or more switches of the switching controller 100 are switched in connection with the dimmer functionality. The timer, in turn, may provide the timer signal based on a clock signal from a clock source. A quartz oscillator, for example, could be used.

In particular, the controller 92 together with the switching controller 100 implements a control loop in some examples. In this case, at least one switch of the switching controller 100 is switched as a manipulated variable of the control loop, i.e., it is optionally operated in the conductive or non-conductive state. In particular, the average current flow to the load 96 can thereby be regulated, whereby the brightness of an illuminant implementing the load can be regulated. The reference variable may be determined on the basis of the dimmer signal 93.

Figure 2:
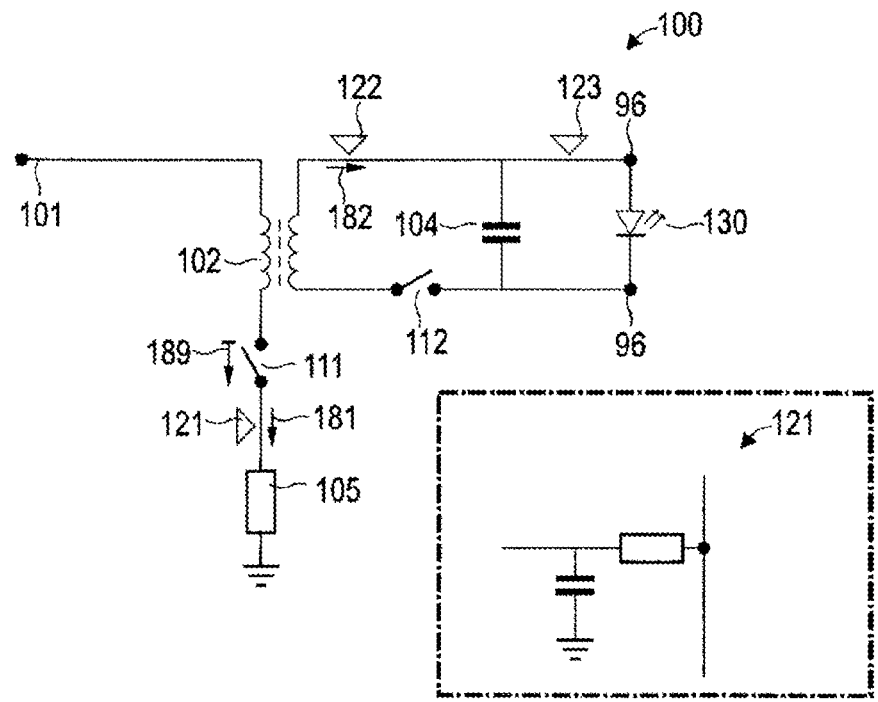
FIG. 2 illustrates schematically a flyback converter of a control gear according to various examples.

FIG. 2 illustrates aspects with regard to the switching controller 100. FIG. 2 illustrates an exemplary implementation of the switching controller 100. In the example in FIG. 2, the switching controller 100 is implemented as a flyback converter with potential isolation.

The flyback converter 100 comprises a pair of coils 102 that implement a transformer. This means that the coils 102 are inductively coupled. The coils 102 act as energy stores.

The flyback converter 100 also comprises a switch 111, which is arranged on the primary side of the coils 102 toward ground, along with a resistor 105. Furthermore, the flyback converter 100 comprises a switch 112 arranged on the secondary side of the coils 102. The flyback converter 100 also comprises a capacitor 104 that provides smoothing functionality. In some examples, a diode could also be used instead of the switch 112.

In the example in FIG. 2, a light-emitting diode 130 is also shown which is connected to the output connection 96 of the flyback converter 100 and which implements the load.

FIG. 2 further illustrates how the current flow 181 on the primary side of the coils 102 can be measured by a measuring circuit 121. In addition, FIG. 2 shows how the current flow 182 on the secondary side of the coils 102 can be measured by a further measuring circuit 122 and/or a measuring circuit 123. Each of the measuring circuits 121, 122, 123 could, for example, comprise a shunt resistor. The measuring circuits can be configured to output a measurement signal which is indicative of the respective current flow. It would be possible to use an inductive coupling.

How the flyback converter 100 works will be described below. First phase (i): Initially, the switch 111 is operated in the conductive state. Then, the current flow through the primary coil 102 increases and energy is stored in the coils 102. This means that the switch 111 controls the charging process of the energy store implemented by the coils 102 or by the transformer. At the same time, the switch 112 is switched to be non-conductive; for this reason, no current flows through the secondary coil 102. The current flow to the load 130 is supplied from the smoothing capacitor 104. Second phase (ii): The switch 111 is then switched to be non-conductive and the switch 112 is switched to be conductive. This phase is often referred to as the blocking phase. The energy previously stored in coils 102 supplies the current flow to the load 130 and also charges the capacitor 104. Phases (i) and (ii) are cyclically repeated by the switches 111, 121 suitably switching back and forth between the conductive and non-conductive states.

In some examples, it is possible for a further, third phase (iii) to be present. In this case, both the switch 111 and the switch 112 are operated in the non-conductive state. Phases (i), (iii) and (iii) can then be passed through cyclically and iteratively, for example (i) then (ii) then (iii) and then (i) again and so on.

From the above description, it can be seen that by selectively switching the switches 111, 112, the current flow to the load 130 can be controlled. Operating modes that are different in principle with regard to the switching of the switches 111, 112 are known in this respect. For example, the switches 111, 112 may be operated in the so-called continuous mode. In this case, the switch 111 is switched to the conductive state before the current flow 182 has dropped to zero or, in addition, to negative values. This means that no negative values of the current flow 182 are observed. It would also be possible to operate the switches 111, 112 in the so-called discontinuous mode. In this case, the switch 111 is not switched to the conductive state until the current flow 182 has already dropped to zero for a certain amount of time. The so-called borderline or boundary mode represents the transition from the continuous mode to the discontinuous mode, i.e., the switch 111 is switched to the conductive state precisely when the current flow 182 has dropped to zero.

Another mode referred to as hybrid mode in the various examples. The hybrid mode may refer to a mixture of the discontinuous mode and the continuous mode. Here, in phase (ii), the current flow 182 assumes negative values up to a negative minimum value corresponding to the continuous mode; then, in phase (iii), both the switch 111 and the switch 112 are operated in the non-conductive state corresponding to the discontinuous mode. Very small average current flows to the light-emitting diode 130 can thereby be adjusted. At the same time, due to the provision of the negative minimum value for the current flow 182 during phase (ii), the length of phase (iii) can be dimensioned to be comparatively short, especially in comparison with the traditional discontinuous mode.

In the inset in FIG. 2 (dashed-dotted line), an exemplary implementation of current measuring circuits 121-123 is shown. A shunt resistor and a capacitor are provided. Low-pass filtering can be provided by dimensioning the capacitor. In some examples, such as when a maximum value of the current flow 181 or of the current flow 182 is to be detected, low-pass filtering may not be desirable. In general, therefore, the current measuring circuits 121-123 may have a plurality of branches, each having different filter parameters.

Figure 3:
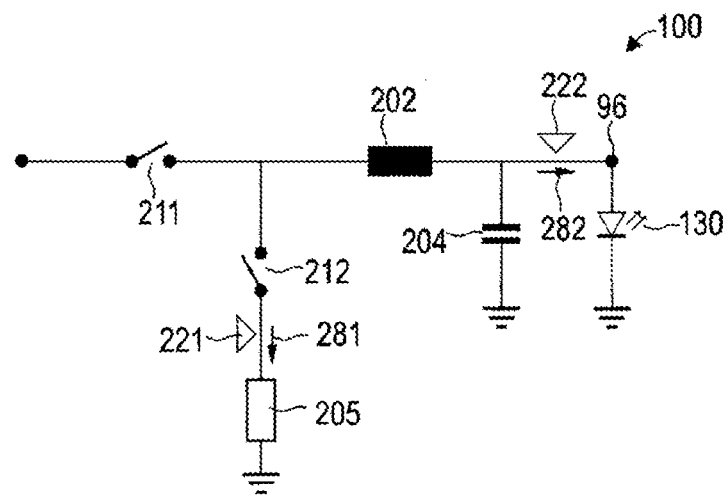
FIG. 3 illustrates schematically a buck converter of a control gear according to various examples.

FIG. 3 illustrates aspects with regard to the switching controller 100. FIG. 3 illustrates an exemplary implementation of the switching controller 100. In the example in FIG. 3, the switching controller 100 is implemented as a buck converter.

The buck converter 100 comprises a coil 202. The coil 202 acts as an energy store.

The buck converter 100 also comprises a switch 211 which is arranged adjacently to the input connection 101 (sometimes also referred to as a high-side switch). The buck converter 100 furthermore comprises a further switch 212 (sometimes also referred to as a low-side switch) arranged toward ground, along with a ground-side resistor 205. Instead of the switch 212, a diode is also sometimes used. A smoothing capacitor 204 is provided.

FIG. 3 also shows how the current flow 281 can be measured by a measuring circuit 221; along with how the current flow 282 can be measured by a measuring circuit 222.

In principle, the operation of the buck converter 100 according to the example in FIG. 3 corresponds to the operation of the flyback converter 100 according to the example in FIG. 2. When the switch 211 is switched to be conductive, the energy store 202 is charged. When the switch 211 is switched to be non-conductive, the energy store 202 is discharged. In particular, it is also possible to operate the buck converter 100 in continuous mode, in discontinuous mode, in boundary mode or in hybrid mode.

In the following, for reasons of simplicity, reference is primarily made to an implementation of the switching controller as a flyback converter; however, the corresponding techniques could also be directly transferred to other types of switching controllers, for example even the buck converter 100 according to the example in FIG. 3.

Figure 4:
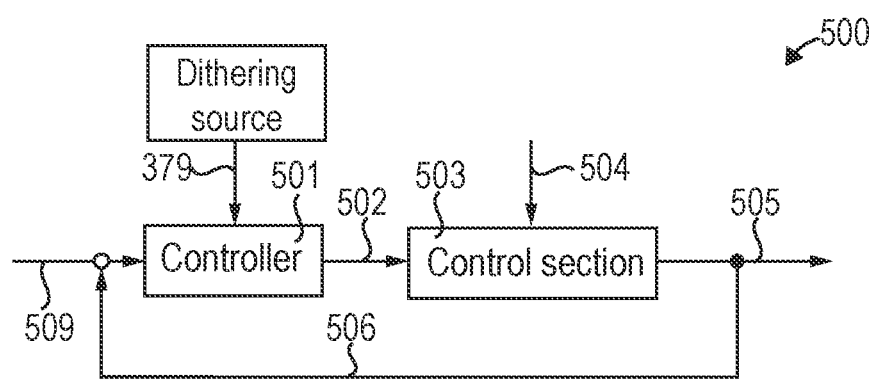
FIG. 4 illustrates schematically a control loop that may be implemented in various examples by a switching controller and a controller of a control gear.

FIG. 4 illustrates aspects with regard to a control loop 500 that may be used in various examples described herein to control the operation of a switching controller 100. The control loop 500 may be implemented in hardware and/or software. The control loop 500 may be implemented, for example, by the controller 92 and the switching controller 100.

The control loop 500 controls the operation of the switching controller 100 by means of a manipulated variable 502. A control section 503 of the control loop 500 is thus implemented by the switching controller 100 and in particular one or more switches 111, 112, 211, 212. The manipulated variable 502 can be implemented, for example, by means of suitable dimensioning of a control signal which is output to the switches 111, 112, 211, 212 and which determines the operation of the switches 111, 112, 211, 212 in the conductive or non-conductive states. A corresponding gate driver could be provided for switches 111, 112, 211, 212 implemented as field-effect transistors.

The control section 503 is also implemented by one or more sensors for monitoring operation. For example, the control section could also comprise the measuring circuits 121, 122, 221, 222. Then, for example, a signal of the measuring circuit 121 or 221 could be combined with a signal of the measuring circuit 122 or 222 in order to determine a measurement signal 506 which is indicative of a controlled variable 505.

The controlled variable 505 is thus influenced by the control of the operation of the switching controller 100 on the basis of the manipulated variable 502. The controlled variable 505 may correlate with the average current flow through the switching controller 100 to the light-emitting diode 130. This means that a change in the controlled variable 505 also causes a change in the average current flow through the switching controller 100 to the light-emitting diode 130 and thus results in a change in the brightness.

Different controlled variables 505 may be implemented in the various examples described herein. For example, a controlled variable 505 could be carried out in relation to a maximum current flow through the switching controller and/or in relation to a minimum current flow through the switching controller. This means that a regulation with regard to certain properties of the current flow is effected by the switching controller 100.

The controlled variable 505, or the measurement signal 506 indicative of the controlled variable, is compared with a reference variable 509 and, based on the comparison, the adjusted manipulated variable 502 is provided. This is achieved by the controller 501. For example, the controller 501 could determine a deviation between the reference variable 509 and the controlled variable 505 and minimize this deviation by suitably varying the manipulated variable 502.

For example, it would be possible for the reference variable 509 to be changed as a function of the average current flow to the load 130; for example, the average current flow to the load 130 could be changed as a function of a desired dimmer level.

In connection with FIG. 4, it also shown that one or more time-varying disturbance variables 504 may act on the control section 503. Changes in the behavior of the control section 503 due to the one or more disturbance variables 504 can be compensated by the control loop 500.

Figure 5:
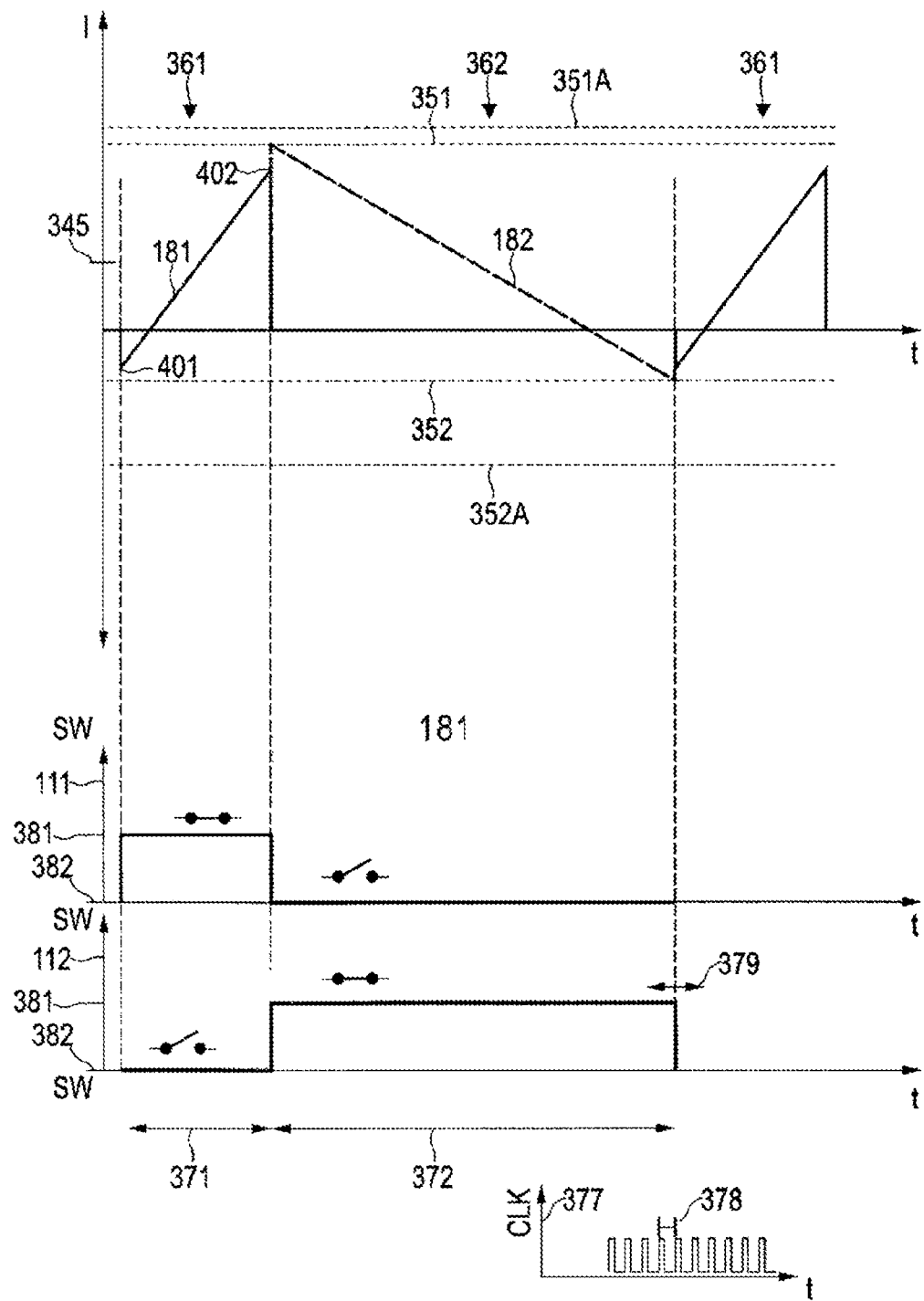
FIG. 5 illustrates schematically the time course of operation of switches of a flyback converter according to various examples.

FIG. 5 illustrates aspects relating to the operation of the switching controller 100 according to various examples. In particular, FIG. 5 illustrates aspects in relation to the operation of a flyback converter 100 (cf. FIG. 2). Corresponding techniques, as described below in connection with FIG. 5, are discussed but could also be used for other types of switching controllers 100.

FIG. 5 illustrates in particular aspects with regard to the current flow 181 (solid line in FIG. 5, top) and further with regard to the current flow 182 (dashed line in FIG. 5, top). From FIG. 5, it can be seen that, in phase (i) 361, the current flow 181 through the switch 111 on the primary side of the transformer implemented by the coils 102 increases from a negative value to a positive value. In the subsequent phase (ii) 362, the current flow 182 through the switch 112 on the secondary side of the transformer implemented by the coils 102 decreases from a positive value, corresponding to the positive maximum value 351 of the current flow in the switching controller 100, to a negative value, corresponding to the negative minimum value 352 of the current flow in the switching controller 100. The ratio of current flow 181 to current flow 182 is determined in particular by the winding ratio of the coils 102. By using the switch 112, instead of a diode, the negative current flows 181, 182 are enabled.

FIG. 5 also shows a minimum value 401 of the current flow 181 and a maximum value 402 of the current flow 181.

FIG. 5 further illustrates aspects relating to the operation of the switches 111, 112 of the switching controller 100. FIG. 5, bottom, shows how the switches 111, 112 are driven in phase (i) 361 and phase (ii) 362. For example, the signal shapes illustrated in FIG. 5, bottom, could correspond to control signals supplied by the controller 92 to the control connections of the switches 111, 112.

From FIG. 5, it can be seen that the controller 92 is configured to operate, in phase (i) 361, the switch 111 in the conductive state 381 and the switch 112 in the non-conductive state 382. The controller 92 is also configured to operate, in phase (ii) 362, the switch 111 in the non-conductive state 382 and the switch 112 in the conductive state 381.

In FIG. 5, the time-averaged current flow 345 through the switching controller 100 is also shown. By varying the time course of the current flows 181, 182, the averaged current flow 345 and thus the brightness of the light-emitting diode 130 can also be varied. This may be done by implementing the control loop 500 while selecting a suitable manipulated variable 505. For example, in various reference implementations, the maximum current flow 351 and the minimum current flow 352 are used as the manipulated variable 505. However, this may have the disadvantage that, due to quantization noise from corresponding comparators which compare a measurement signal of the measuring circuit 122 and/or a measurement signal of the measuring circuit 121 with a corresponding threshold value corresponding to the manipulated variable 502, they may be comparatively imprecise.

Starting with this finding, it may be possible, in the context of the techniques described herein, to use as the manipulated variable 502 the time duration 372 for which the switch 112 is operated in the conductive state 381, i.e., for example, the length of phase (ii) 362. Typically, such a regulation can be implemented comparatively precisely in the time duration. If, for example, the time duration 372 is reduced by adapting the manipulated variable 502, with parameters otherwise unchanged, the average current flow 345 typically increases.

FIG. 5 also illustrates techniques associated with further increasing the precision of the regulation. A timer signal is typically provided, which the controller uses to specifically ensure operation of the switch 112 in the conductive state 381 for the time duration 372. For example, after the time duration 372 has elapsed, the timer signal may assume a different value than before expiration of the time duration 372. In general, the timer signal is thus indicative of the time duration 372 and a switch driver is configured to switch the switch 112 between the conductive state 381 and the non-conductive state 382 on the basis of the timer signal.

Typically, the timer providing the timer signal is configured to provide the timer signal on the basis of a clock signal 377 having a particular clock period 378. For example, the timer signal could indicate the expiration of the time duration 372 coincidentally with an edge of the clock signal 377. The timer signal could be defined as an integer multiple of the clock period 378. Thus, this means that an accuracy with which the time duration 372 can be varied as the manipulated variable 502 can be limited by the clock period 378 of the clock signal 379. Typical clock periods 378 range from microseconds to milliseconds. This can result in a certain inaccuracy in the regulation. Typically, however, the inaccuracy resulting from the clock period 378 in connection with a manipulated variable 502, defined in the time duration, of the control loop 500 is comparatively small, for example, particularly in comparison with an inaccuracy resulting from quantization noise in connection with a manipulated variable 502 defined with reference to the current flows 181, 182 according to reference implementations.

In order to further reduce this remaining inaccuracy, dithering techniques can be used. For example, it would be possible for a dithering source to be configured to provide a dithering signal. The dithering signal may cause a modulation 379 of the time duration 372. This modulation 379 could be random or pseudo-random, for example. A linear shift register may be used to provide the dithering signal. The frequency spectrum of the modulation 379 could have a predetermined shape, for example triangular, etc. The frequency spectrum of the modulation 379 could be centered around zero. The modulation 379 could lie, for example, in the range from 20% to 200% of the clock period 378, optionally in the range from 80% to 120%. In this way, an accuracy, averaged across several cycles of the phases 361, 362, which is higher than without a dithering signal can be achieved for the regulation, i.e., the limitation due to the finite clock period 378 can be eliminated or alleviated.

Various techniques have been described above with which the time duration 372, for which the switch 112 on the secondary side of the transformer implemented by the coils 102 is operated in the conductive state 381, is varied on the basis of a manipulated variable 502 of the control loop 500. In some examples, it would also be possible for the manipulated variable 502 to also comprise the time duration 371. However, it would also be possible for the time duration 371 for which the switch 111 is operated in the conductive state 381 during phase (i) 361 not to be changed within the context of the control loop 500. This may mean, in particular, that, although the manipulated variable 502 comprises the time duration 372, it does not comprise the time duration 371.

This may allow a parametrized adjustment of the time duration 371, for example as a function of the reference variable 509 or in general of the dimmer level of the light-emitting diode 130. This in turn enables balanced control both of the switching frequency of the switching controller, i.e., the period duration of a cycle of phases (i) 361 and (ii) 362, on the one hand and of the external current flows 351, 352 on the other hand. This makes it possible to optimize the operation of the switching controller 100 with respect to flickering on the one hand and losses on the other hand. This is also illustrated in connection with FIGS. 6 and 7.

Figure 6:
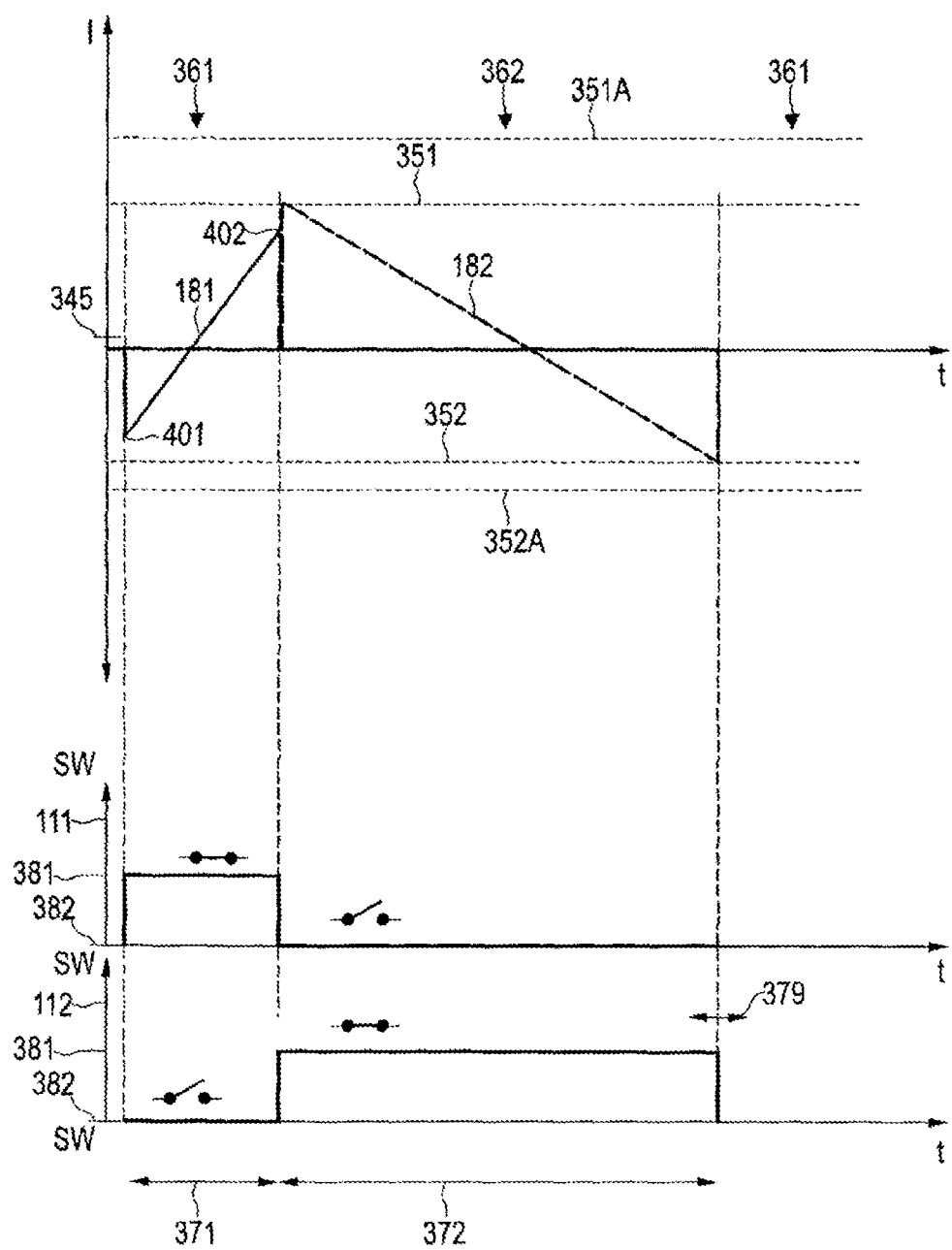
FIG. 6 illustrates schematically the time course of operation of switches of a flyback converter according to various examples.

FIG. 6 illustrates aspects relating to the operation of the switching controller 100. Here, the example in FIG. 6 corresponds in principle to the example in FIG. 5. In the example in FIG. 6, however, the desired average current flow 345 is reduced, for example due to a reduced dimmer level corresponding to a lower brightness of the light-emitting diode 130, compared to the example in FIG. 5. This is taken into account by a correspondingly adapted reference variable 509 of the control loop. The adapted reference variable 509 in turn causes, with the same time duration 371, the time duration 372 as the manipulated variable 502 of the control loop 500 to be adjusted, namely in particular lengthened in comparison with the example in FIG. 5. This means that the sum of the time durations 371, 372 increases and that the switching frequency at which the switching controller 100 is operated thus decreases.

In such and other scenarios, it may happen that, at a certain dimmer level or a certain dimensioning of the reference variable 509, the switching frequency at which the switching controller 100 is operated drops too strongly. This can cause flickering of the light-emitting diode 130, which should be avoided. In order to avoid an excessively strong drop in the switching frequency, it is possible to modify the time duration 371 as a parameter, i.e., outside the control loop 500. This is shown in connection with FIG. 7.

Figure 7:
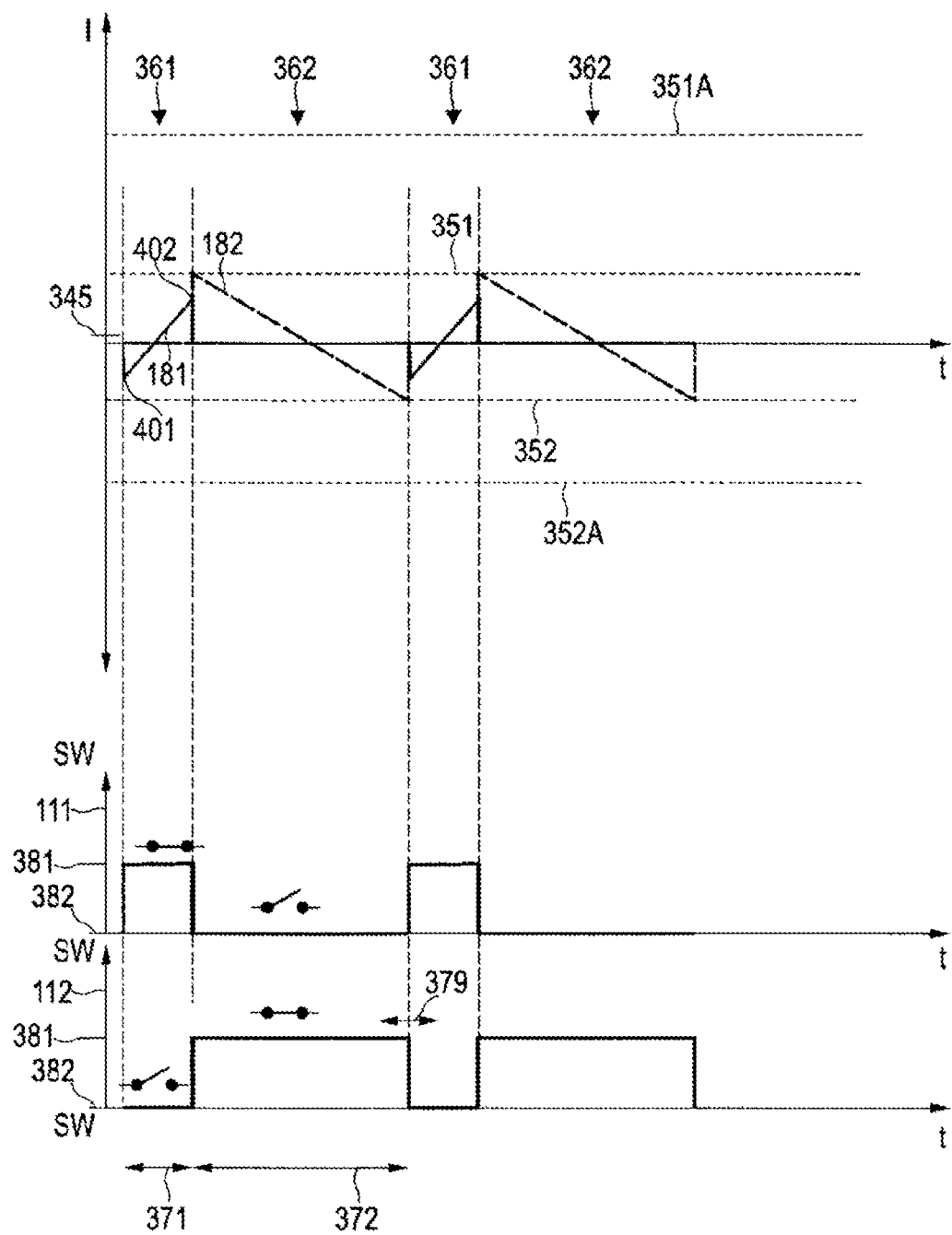
FIG. 7 illustrates schematically the time course of operation of switches of a flyback converter according to various examples.

FIG. 7 illustrates aspects relating to the operation of the switching controller 100. Here, the example in FIG. 7 corresponds in principle to the examples in FIGS. 5 and 6. In the example in FIG. 7, the desired average current flow 345 is dimensioned as in the example in FIG. 6, i.e., in particular to be smaller than in the example in FIG. 5.

However, the time duration 371 is determined here as a function of the predetermined average current flow 345. In this case, there is a tendency to dimension the time duration 371 to be smaller for smaller average current flows 345 to the light-emitting diode 130. Various effects can be achieved in this way.

The parametrized change in the time duration 371 makes it possible to reduce or completely avoid a decrease in the switching frequency for smaller average current flows 345 to the light-emitting diode 130. Flickering can be avoided in this way.

Furthermore, the parametrized change of the time duration 371 makes it possible to achieve smaller extreme values 351, 352 for the current flow 181, 182 in the switching controller 100 for smaller average current flows 345 to the light-emitting diode 130. Losses can thereby be reduced.

A rise in the switching frequency can also be avoided or in any case reduced by the parametrized change in the time duration 371. Typically, at particularly large switching frequencies, the power loss increases due to the frequent switching operations for the switches 111, 112.

The change in the time duration 371 as a function of the predetermined average current flow 345 can be taken into account with regard to the regulation by means of the reference variable 509. In particular, the reference variable 509 may be determined as a function of the time duration 371, for example in addition to a dependence on the predetermined average current flow 345. This is described in the context of FIG. 8.

Figure 8:
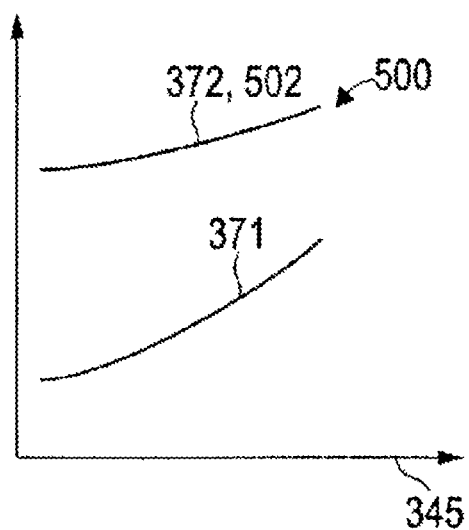
FIG. 8 illustrates aspects relating to the variation of a manipulated variable as a function of a reference variable of the control loop according to various examples.

FIG. 8 illustrates aspects relating to the dependence of the time duration 371 on the average current flow 345. It can be seen from FIG. 8 that there is a tendency for smaller dimensioning of the time duration 371 for smaller average current flows 345.

FIG. 8 also illustrates aspects relating to the regulation of the time duration 372 by means of the control loop 500, by suitably selecting a corresponding manipulated variable 502. It can be seen from FIG. 8 that for smaller average current flows 345, particularly due to the smaller dimensioning of the time duration 371, there may also be a tendency for smaller time durations 372.

The dependencies shown in FIG. 8 are purely illustrative and may in general depend on the conditions of the control section 503.

For example, a look-up table could be provided, which specifies the reference variable 509 to be selected, which relates to the manipulated variable 502 comprising the time duration 372, for different dimmer levels or average current flows 345 and for different time durations 371. In some examples, however, there could also be a one-to-one association between dimmer levels, time durations 371, and reference variable 509, which is defined as the manipulated variable 502 with respect to the time duration 372.

In particular, the rate of change of the reference variable 509 and thus at least in some examples also the rate of change with which the time duration 371 is adjusted can be determined, in particular be limited, on the basis of a time constant of the control loop 500. For example, this can prevent the time duration 371 from being changed too quickly outside the control loop 500; in such a case, the adaptation of the time duration 372 as the manipulated variable 502 of the control loop 500 would only take place with a time delay so that an unwanted change in the brightness of the light-emitting diode 130 would be observed.

Techniques have therefore been described above for adjusting the primary-side current flow 181 in a parametrized manner as a function of the reference variable 509, namely by changing the time duration 371. Alternatively, it would also be possible to set, for instance, the maximum value 402 of the current flow 181 and to use a variable time duration 371. In the various examples described herein, it would thus be possible to determine the maximum value 402 of the current flow 181 as a function of the time duration 372. This has the effect that, as a function of the time duration 372, the time duration 371 is also varied. For this purpose, the current flow 181 can be monitored and, on the basis of the monitoring, the switch 111 can be switched when the maximum value 402 is reached.

Such techniques can increase robustness with respect to changes in the mains voltage. In particular, robustness with respect to temporal fluctuations in the mains voltage (ripple) can be increased. Such fluctuations in the mains voltage often occur at frequencies in the range from 20 Hz to 100 Hz, i.e., comparatively slowly compared to typical switching frequencies or the time durations 371, 372. Fluctuations in the mains voltage can be caused by other consumers. In absolute terms, the amplitude of the fluctuations in the mains voltage can be small, for example 0.5%-2% of the mean amplitude of the mains voltage.

This finding is based on the following reasoning.

The average current flow 345 to the light-emitting diode is given by:

$$i_{led} = \frac{1}{2} i_s \frac{t_s}{t_s + t_p} \qquad \text{Equation (1)}$$

where $i_s$ denotes the maximum value 351, $t_s$ the time duration 372 and $t_p$ the time duration 371. This means that the current flow 345 is very sensitive to variations in the maximum value 351 of the secondary-side current flow 182, $i_s$, wherein the maximum value 351 of the secondary-side current flow 182 is directly dependent on the maximum value 402 of the current flow 181. Changes in the maximum value 402 thus have a strong impact on changes in the average current flow 345.

Fluctuations of the mains voltage $V_B$ are assumed:

$$V_B \rightarrow V_B \pm \frac{r}{100} V_B \qquad \text{Equation (2)}$$

Typically, r≈1-5.

The maximum value 402 is for two different time durations 371:

$$i_p(t_p) = \frac{V_B}{L_p} t_p \qquad \text{Equation (3)}$$

wherein $L_P$ denotes the primary-side inductance of the transformer 102.

The change in the time duration 371 results from equation (1) with equation (2) with equation (3) to yield:

$$\Delta t = t_p \frac{|r|}{100 \pm |r|} \qquad \text{Equation (4)}$$

It follows therefrom that such fluctuations in the mains voltage require a change in the time duration 371, $t_p$, in order to achieve the same maximum value 351 of the primary-side current flow 371. It also follows from equation (1) that the fluctuations in the mains voltage over the variation of the time duration 371 have an, albeit limited, influence on the average current flow 345.

It can therefore make sense to use, as already described, the time duration 372 as the manipulated variable and to fix the maximum value 402 of the primary-side current flow 371. It is thus possible to switch the switch 111 when the primary-side current flow 181 reaches the maximum value 402. Although the time duration 371 then varies with fluctuations in the mains voltage, this has a lesser influence on the average current flow 345 than a variation of the maximum value 402 and thus of the maximum value 351; cf. equation (1) and equation (4).

The maximum value 402 can, as described above in connection with the time duration 371, be determined in a parametrized manner as a function of the reference variable, such as the average current flow 345 to the light-emitting diode. In another and particularly simple implementation, the maximum value 402 of the primary-side current flow 371 could be determined as a function of the time duration 372. In this case, for example, a low-pass filtering of the time duration 372 can be provided in order to take into account such a slow change, for example by changing the reference variable. Rapid regulation to a specific average current flow 345 is then achieved as before by controlling the time duration 372. A robust regulation can thereby be achieved.

In order to switch the switch 111 when the maximum value 402 is reached, a comparator circuit can, for example, be provided, which compares the measurement signal of the measuring circuit 121 with the predetermined maximum value 402 (cf. FIG. 2) and switches the switch 111 as a function of the comparison. As a result, fast switching can take place without digitization by processing in the analog domain.

With regard to FIGS. 5-7, it is further shown that threshold values 351A, 352A may also be provided for the current flows 181, 182. For example, a check could be performed by means of the measuring circuits 121, 122 as to whether one or more of the current flows 181, 182 exceed a corresponding threshold value 351A, 352A. If such an exceeding of one or both of the threshold values 351A, 352A is detected, the regulation of the switching controller 100 could be skipped by taking into account the manipulated variable 502 defined in the time duration. In this way, it can be ensured that, due to the regulation in the time duration, peak values which would cause damage to the switches 111, 112 or other electronic components of the switching controller 100 are not reached for the current flows 181, 182.

Figure 9:
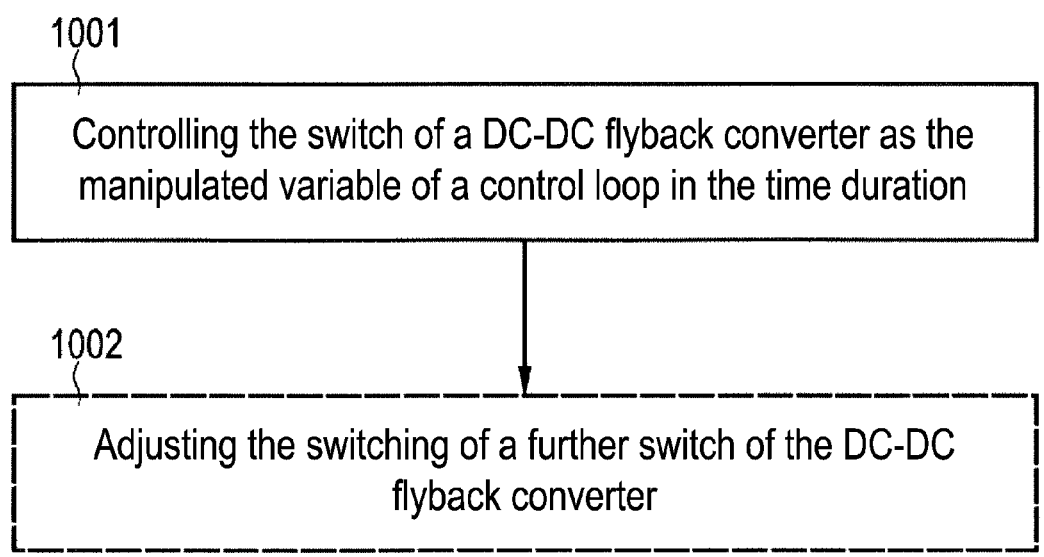
FIG. 9 is a flowchart of an exemplary method.

FIG. 9 is a flowchart of an exemplary method. For example, the method according to FIG. 9 could be executed by the controller 92.

In block 1001, a switch of a flyback converter, such as a flyback converter with potential isolation, is controlled on the basis of a manipulated variable of a control loop. Here, the manipulated variable is defined in the time duration. For example, the switch arranged on the secondary side of the flyback converter with potential isolation could be switched by the manipulated variable.

Figure 10:
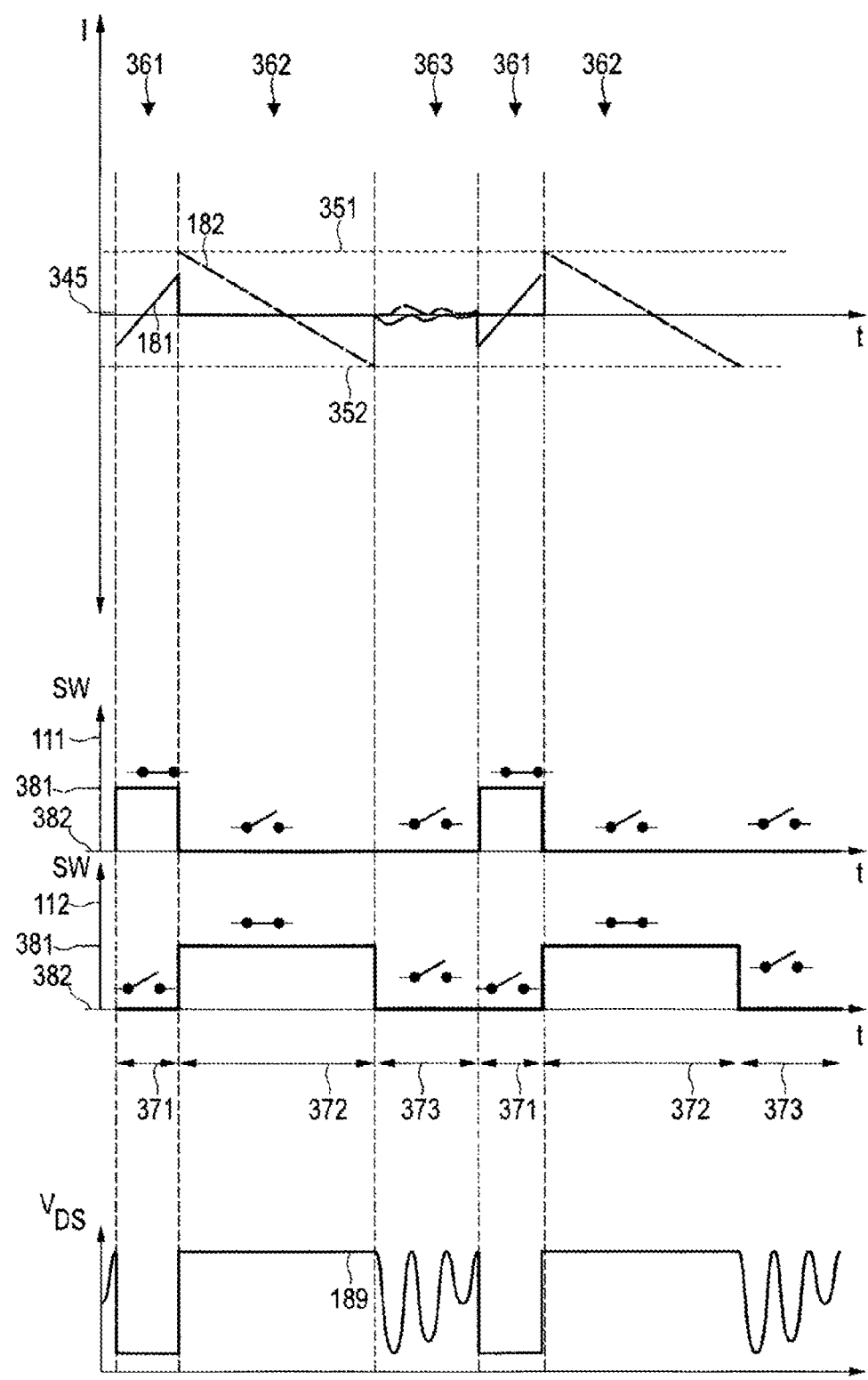
FIG. 10 illustrates schematically the time course of operation of switches of a flyback converter according to various examples.

Optionally, in block 1002, it would be possible for the method to comprise adjusting the switching of a further switch of the flyback converter as a function of a variable defining the reference variable. For example, in block 1002, the time duration for which the further switch is operated in a conductive state may be determined in a parametrized manner as a function of a dimmer level, which also defines the reference variable. In particular, it is thus possible to adapt the switching of the further switch outside the control loop; the control loop can then react to the adaptation of the switching of the further switch. For example, in block 1002, the switching of a further switch arranged on the primary side of the flyback converter with potential isolation could be adapted FIG. 10 illustrates aspects relating to the operation of a switching controller 100 according to various examples. In particular, FIG. 10 illustrates aspects relating to the operation of a flyback converter. In the example in FIG. 10, the operation of a flyback converter is illustrated; however, corresponding techniques could also be implemented for other types of switching controllers, for example in particular for buck converters with two switches.

FIG. 10 illustrates aspects relating to the operation of the switches 111, 112 of the switching controller 100. FIG. 10 shows that a phase (I) 361 is implemented, in which the switch 111 is operated in the conductive state 381 and in which the switch 112 is operated in the non-conductive state 382. Furthermore, a phase (II) 362 is also implemented, in which the switch 111 is operated in the non-conductive state 382 and in which the switch 112 is operated in the conductive state 381. In contrast to the examples in FIGS. 5-7, a phase (III) 363 is additionally implemented, in which both the switch 111 and the switch 112 are operated in the non-conductive state 382.

It can be seen from FIG. 10 that the current flows 181, 182 assume comparatively small values during phase (III) 363. This makes it possible to dimension the average current flow 345 to the light-emitting diode 130 to be particularly small. By lengthening or shortening the time duration 373 during which both the switch 111 and the switch 112 are operated in the non-conductive state 382, i.e., by lengthening or shortening the length of phase (III) 363, the average current flow 345 to the light-emitting diode 130 can be adjusted with particular precision.

Thus, in order to adjust the average current flow 345 particularly finely, it would be possible for the manipulated variable 502 of the control loop 500 to comprise the time duration 373. This means that even a manipulated variable 502 defined in the time duration can be used in connection with phase (III) 363.

In FIG. 10, it can be seen that, for example in contrast to the conventional discontinuous mode, in phase (II) 362, the switch 112 is operated in the conductive state 381 until the current flow 182 assumes a negative maximum value 352 (which corresponds in principle to the continuous mode). In addition, however, phase (III) 363 is provided (which corresponds in principle to the discontinuous mode). In the conventional discontinuous mode, the current flow 182 decreases only to zero but does not assume any significant negative values. For this reason, the mode illustrated in FIG. 10 for the operation of the flyback converter 100 may also be referred to as a hybrid mode, since it represents a mixture of the discontinuous mode and the continuous mode.

In particular, it is possible for the magnitude of the positive maximum value 351 to have approximately the same order of magnitude as the magnitude of the negative minimum value 352. For example, it would be possible for the magnitude of the maximum value 351 to lie in the range from 20% to 500% of the magnitude of the minimum value 352. This means that a rough adjustment of the average current flow 345 can already be effected by a suitable selection of the minimum value 352. The fine adjustment of the average current flow 345 can then be effected by suitably dimensioning the length of phase (III) 363 duration or the time duration 373.

Such a fine adjustment of the average current flow 345 by providing phase (III) 363 could be quantified, for example, as follows: The current flow 181, 182 to the load averaged across all phases (I), (II) and (III) 361-363 may differ only insignificantly from the current flow 181, 182 to the load 130 averaged only across phases (I) and (II) 361, 362. This means that phase (III) 363 contributes only comparatively little to the adjustment of the average current flow 181, 182 to the load 130. For example, it would be possible for the current flow 181, 182 to the load 130 averaged across all phases (I), (II) and (III) 361-363 to be in the range from 80% to 120% of the current flow 181, 182 to the load 130 averaged only across phases (I) and (II) 361, 362, optionally in the range from 95% to 105%. Such a fine adjustment of the average current flow 181, 182 to the load 130 is characteristic of the hybrid mode described herein and differs substantially from the discontinuous mode where, due to the corresponding phase (III), a stronger adjustment of the average current flow 181, 182 to the load 130 occurs, thereby reducing the switching frequency particularly strongly. In the present case, this strong decrease in switching frequency can be avoided by using negative current flow 181, 182 during phases (I) 361 and (II) 362.

FIG. 10 shows that, during phase (III) 363, oscillations of the voltage 189 can occur via the switch 111 (in FIG. 10, shown at the very bottom and labeled VDS (drain-source voltage); see also FIG. 2) and as a consequence thereof also oscillations in the current flows 181, 182. It would be possible for the voltage 189 to be detected by a suitable measuring circuit. The current flow 181 through the switch 111 is measured by the measuring circuit 121. It would be possible for the current flow 181 and/or the voltage 189 to be taken into account when switching the switch 111 from the non-conductive state 382 to the conductive state 381 at the transition from phase (III) 363 to phase (I) 361. This makes it possible, for example, to switch at small current flows 181, 182 (as shown in FIG. 10). However, it would also be possible to switch at low voltages VDS (not shown in FIG. 10). In particular, the power loss during switching can thereby be reduced by switching, for example, when a particularly low current flow 181 is taken into account or a particularly low voltage 189 is present. Such techniques are sometimes referred to as valley switching.

It was explained above that the manipulated variable 502 with respect to phase (III) 363 may comprise the time duration 373. In connection with phase (I) 361 and phase (II) 362 as well, it would be possible to use a manipulated variable 502 defined in the time duration. For example, it would be possible, as discussed above in connection with FIGS. 5-9, for the manipulated variable 502 of the control loop 500 to comprise the time duration 372. Alternatively, however, it would also be possible for the manipulated variable 502 to comprise, for example, the maximum current flow 351 and/or the negative current flow 352. This would mean that, with regard to phases (I) 361 and (II) 362, a regulation takes place via the current intensity, whereas with regard to phase (III) 363, a regulation takes place in the time duration. Here, the reference variable 509 of the control loop 500 can in turn be determined as a function of the average current flow 345, i.e., for example, as a function of the dimmer level.

In other words, this means that a change in the desired average current flow 345 to the light-emitting diode 130 can be implemented in a wide variety of ways; for example, the maximum value 351 of the current flow 181, 182 in the switching controller 100 and/or the minimum value 352 of the current flow 181, 182 in the switching controller 100 could be changed by adjusting the corresponding reference variable 509 in phase (I) 361 or in phase (II) 362. Alternatively or additionally, the time duration 373 could also be changed by adjusting the corresponding reference variable 509 in phase (III) 363.

In this context, it is possible for a wide variety of techniques to be used with regard to adjusting such properties of the operation of the switching controller 100 as a function of a changed dimming level or of a changed desired average current flow 345. In particular, a particularly good trade-off can be made thereby between flickering at too low switching frequencies on the one hand and power loss at too high switching frequencies on the other hand. For example, it would be possible for a change in the average current flow 345 to cause a first change in the reference variable 509 with regard to the time duration 373 in phase (III) 363, along with a second change in the reference variable 509 in phase (I) 361 and in phase (II) 362 with regard to the maximum value 351 and/or the minimum value 352. This generally means that, when the average current flow 345 changes, both the length of the phases (I) 361 and (II) 362 can be adjusted, as can the length of phase (III) 363. Thus, a reference variable 509 defined with respect to phase (I) 361 and/or phase (II) 362 and/or a reference variable defined with respect to phase (III) 363 could be adjusted. The relative adjustment of these two reference variables can be effected as a function of the switching frequency and/or loss during switching. For example, a switching frequency could thereby be stabilized at a desired value. For example, it would be possible to predetermine a ratio of the aforementioned first change to the second change. For example, the ratio could be predetermined as a function of the switching frequency and/or the losses during switching. In this way, depending on the position in the parameter space, the lengths of the different phases 361-363 can be varied to different degrees so that the switching frequency can be optimized with regard to flickering and power loss.

Figure 11:
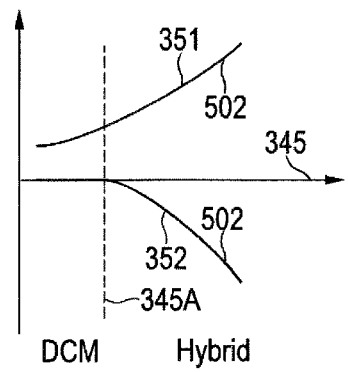
FIG. 11 illustrates aspects relating to the variation of manipulated variables as a function of a reference variable of the control loop according to various examples.

FIG. 11 illustrates aspects relating to the operation of the switching controller 100. In particular, FIG. 11 illustrates aspects with regard to the choice of the manipulated variable 502 in phases (I) 361 and (II) 362, which comprises the maximum value 351 and the minimum value 352 of the current flow 181, 182 through the switching controller 100.

FIG. 11 shows how the manipulated variable 502 and thus the extreme values 351, 352 as corresponding manipulated values are adjusted as a function of the desired average current flow 345. It can be seen from FIG. 11 that, for small average current flows 345, smaller extreme values 351, 352 can also be implemented by an appropriate adjustment of the manipulated variable 502. In this case, the minimum value 352 is set to zero, in particular for average current flows 345 which fall below a certain threshold value 345A. The operation of the switching controller 100 then corresponds to the discontinuous mode. By such techniques, particularly small average current flows 345 can be achieved and adjusted precisely.

Figure 12:
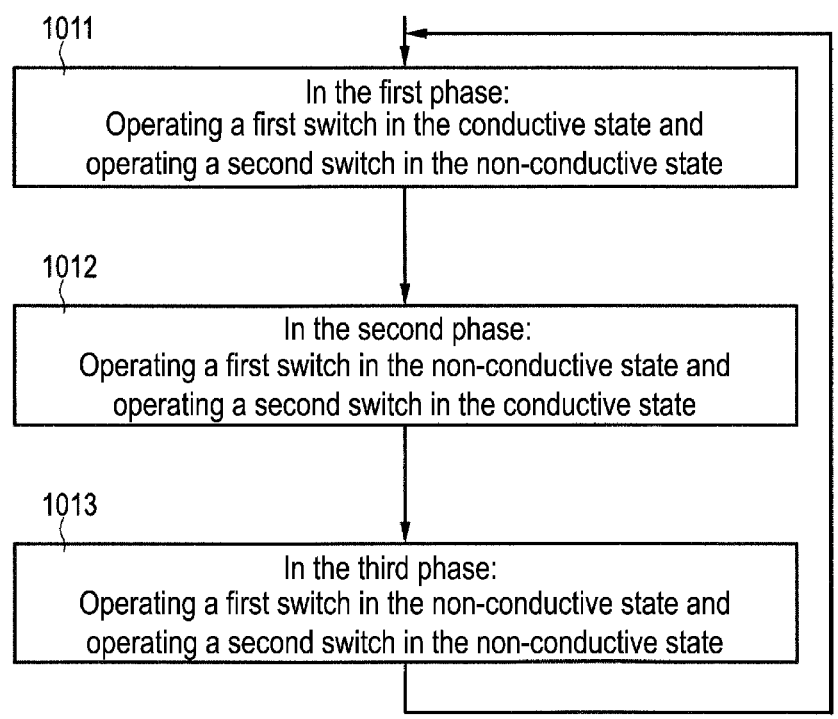
FIG. 12 is a flowchart of an exemplary method.

FIG. 12 is a flowchart of an exemplary method. For example, the method could, according to the example in FIG. 12, be performed by the controller 92 of the control gear 90.

First, in block 1011, a first phase is implemented, for example phase (I) 361 as described above in connection with the figures. Here, a first switch of a switching controller is operated in the conductive state and a second switch of the switching controller is operated in the non-conductive state. The switching controller could be, for example, a buck converter or even a flyback converter with potential isolation.

Then, in block 1012, a second phase is implemented, for example, phase (II) 362, which was described above in connection with the figures. Here, the first switch is operated in the non-conductive state and the second switch is operated in the conductive state.

Then, in block 1013, a third phase is implemented, for example phase (III) 363, as described above in connection with the figures. Here, the first switch and the second switch are operated in the non-conductive state.

Then block 1011 is repeated.

Figure 13:
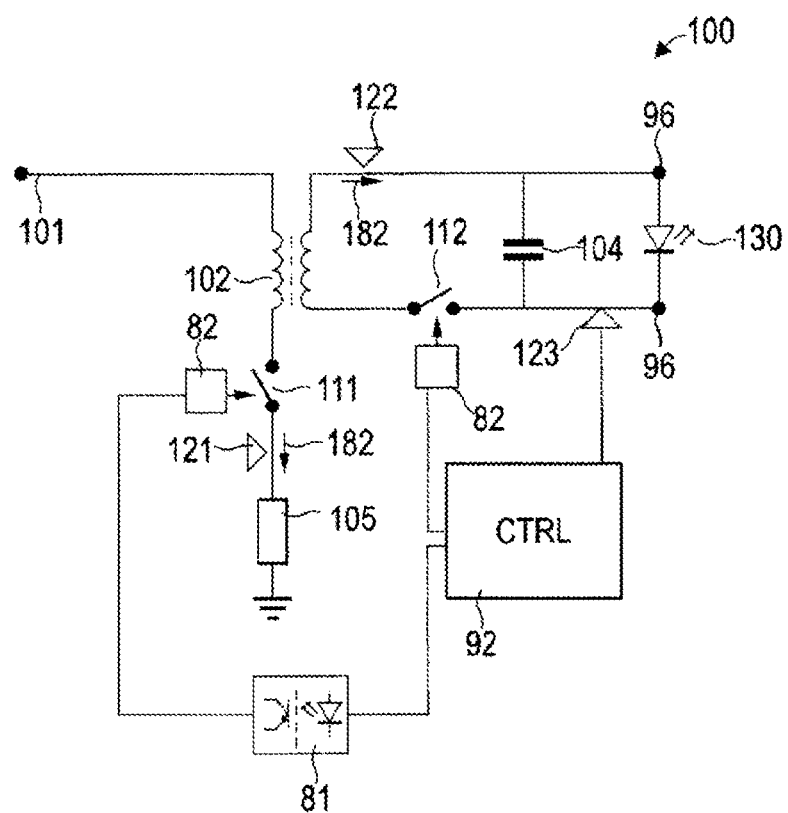
FIG. 13 illustrates schematically a flyback converter of a control gear according to various examples.

FIG. 13 illustrates schematically a flyback converter 100 according to various examples. In the example in FIG. 13, the controller is connected to the current measuring circuit 123. Here, the current measuring circuit 123 is arranged between the output connection 96 and the switches 111, 112. Such an arrangement of the current measuring circuit 123 would also be conceivable for other types of switching controllers.

In the implementation of the switching controller as a flyback converter, as shown in FIG. 13, the current measuring circuit 123 is in particular arranged on the secondary side of the transformer 102.

The controller 92 is likewise arranged on the secondary side of the transformer 102. As described above in the various examples, the controller 92 is configured to determine the manipulated variable of a control loop 500 for switching the switch 112 and the switch 111 as a function of a measured value of the current measuring circuit 123. The measured value of the current measuring circuit 123 can thus be taken into account as measurement signal 506 of the control loop 500 (cf. FIG. 4).

In this case, it is generally possible to implement different variants of the control loop. For example, it would be possible for the manipulated variable 502 to comprise the maximum value 402 of the primary-side current flow 181. It would alternatively or additionally be possible for the manipulated variable to comprise the maximum value 351 of the secondary-side current flow 182. In other examples, a manipulated variable 502 could also be taken into account in the time duration, for example, the time duration 372 (cf. FIGS. 5-7).

In general, even if the switch 111 is not switched as the manipulated variable 502 of the control loop 500, the switch 111 could generally still be switched by the controller 92, for instance as a function of the reference variable 509 or derived from the manipulated variable 502. An optocoupler 81 is provided in order to transmit the corresponding control signal from the secondary side to the primary side. In FIG. 13, the control signal is passed to a, generally optional, gate-driver unit 82 of the switch 111. A gate driver unit 82 of the switch 112 is also driven.

By using the measurement signal 506 of the control loop 500, which corresponds to a measured value of the measuring circuit 123 arranged on the output side, a particularly precise regulation can take place. In particular, a reference variable 509 corresponding to the average current flow to the light-emitting diode 130 can be implemented with particular precision. For example, no model assumptions concerning the behavior of electrical components of the switching controller 100 have to be made in order to draw conclusions about the average current flow 345 to the light-emitting diode 130.

Moreover, by providing the controller 92 on the secondary side of the transformer 102 in the case of a flyback converter 100, a supply voltage corresponding to SELV (safety extra-low voltage) requirements may be used.

The implementation by means of an optocoupler 81 in the case of a flyback converter 100 is also comparatively inexpensive.

In summary, techniques have been described above which make it possible to adjust the average current flow through a switching controller to a load in a particularly precise manner. By means of the techniques described herein, it is also possible to optimally dimension the switching frequency at which the switches of the switching controller are operated with respect to flickering on the one hand and power loss on the other hand over a wide adjustment range of the average current flow to the load. By means of the techniques described herein, it may be possible to stabilize the switching frequency over a wide adjustment range at a desired value.

Of course, the features of the previously described embodiments and aspects of the invention may be combined with each other. In particular, the features may be used not only in the combinations described but also in other combinations or separately without departing from the scope of the invention.

For example, various techniques have been described above in connection with a flyback converter. However, such techniques could also be used in connection with other switching controllers.

Instead of a light-emitting diode, other electrical consumers can also be supplied as a load.

What is claimed is:

1. A control gear (90) for an electrical load (130), comprising:
   a DC-DC flyback converter (100) having a transformer (102), a first switch (111) arranged on a primary side of the transformer (102) and a second switch (112) arranged on a secondary side of the transformer (102),
   a controller (92) configured to switch the second switch (112) on the basis of a manipulated variable (502) of a control loop (500), wherein the manipulated variable (502) comprises a time duration (372) for which the second switch (112) is operated in a conductive state (381); and
   a dithering source configured to provide a dithering signal;
   wherein the dithering signal causes a modulation (379) of the time duration, for which the second switch is operated in the conductive state (381), as the manipulated variable (502).

2. The control gear (90) according to claim 1,
   wherein the manipulated variable (502) does not comprise a further time duration (371) for which the first switch (111) is operated in the conductive state (381).

3. The control gear (90) according to claim 1,
   wherein a maximum value (402) of a current flow (181) through the first switch (111) and/or a further time duration (371) for which the first switch (111) is operated in the conductive state (381) is determined as a function of a predetermined average current flow (345) through the DC-DC flyback converter (100) to the load (130).

4. The control gear (90) according to claim 3,
   wherein the maximum value (402) and/or the further time duration (371) for smaller predetermined average current flows (345) through the DC-DC flyback converter (100) to the load (130) is smaller.

5. The control gear (90) according to claim 1,
   wherein the controller (92) is configured to switch the first switch (111) when a current flow (181) through the first switch (111) reaches a predetermined maximum value (402).

6. The control gear (90) according to claim 5,
   wherein the predetermined maximum value (402) of the current flow (181) through the first switch (111) is determined as a function of the time duration (372) for which the second switch (112) is operated in the conductive state (381).

7. The control gear (90) according to claim 6,
   wherein the maximum value of the current flow through the first switch (111) is determined as a function of a low-pass filtering of the time duration (372) for which the second switch (112) is operated in the conductive state.

8. The control gear (90) according to claim 1,
   wherein a reference variable (509) of the control loop (500) is determined as a function of a predetermined average current flow (345) through the DC-DC flyback converter (100) to the load (130) and/or as a function of a further time duration (371) for which the first switch (111) is operated in the conductive state (381).

9. The control gear (90) according to claim 8,
   wherein the controller (92) is further configured to limit a rate of change of the reference variable (509) and/or a rate of change of the further time duration (371), for which the first switch (111) is operated in the conductive state (381), on the basis of a time constant of the control loop (500).

10. The control gear (90) according to claim 1, furthermore comprising:
    a measuring circuit (122) configured to measure a current flow (182) through the second switch (112),
    wherein the controller (92) is configured to selectively skip switching of the second switch (112) as the manipulated variable (502) of the control loop (500) as a function of a threshold value comparison between the current flow (182) through the second switch (112) and a predetermined threshold value (351A, 352A).

11. A control gear (90) for an electrical load (130), comprising:
    a DC-DC switching controller (100) having a first switch (111, 112, 211, 212), a second switch (112, 212), and an energy store (102, 202); and
    a controller (92) configured to operate, in a first phase (361), the first switch (111, 211) in a conductive state (381) and the second switch (112, 212) in a non-conductive state (382), and to operate, in a second phase (362), the first switch (111, 211) in the non-conductive state (382) and the second switch (112, 212) in the conductive state (381), and to operate, in a third phase (363), the first switch (111, 211) in the non-conductive state (382) and the second switch (112, 212) in the non-conductive state (382);
    wherein the controller (92) is configured to switch the first switch (111, 211) and the second switch (112, 212) between the conductive state (381) and the non-conductive state (382) on the basis of a manipulated variable (502) of a control loop (500),
    wherein a controlled variable (505) of the control loop (500) comprises a maximum value (351) of a current flow (181, 182) through the DC-DC switching controller (100) and/or a minimum value (352) of the current flow (181, 182) through the DC-DC switching controller (100)

wherein the controller (92) is configured to switch the first switch (111, 211) and the second switch (112, 212) between the conductive state (381) and the non-conductive state (382) on the basis of a manipulated variable (502) of a control loop (500), wherein the manipulated variable (502) comprises a time duration (373) during which the first switch (111, 211) and the second switch (112, 212) are operated in the non-conductive state (382) in the third phase (363); and wherein a reference variable (509) of the control loop (500) is determined as a function of a predetermined average current flow (345) through the DC-DC switching controller (100) to the load (130).

12. The control gear (90) according to claim 11, wherein the controller (92) is configured to operate, in the second phase (362), the first switch (111, 211) in the non-conductive state (382) and the second switch (112, 212) in the conductive state (381) until a current flow (182) through the DC-DC switching controller (100) assumes a negative minimum value (352), wherein the magnitude of a positive maximum value of the current flow (182) through the DC-DC switching controller (100) lies in the range from 20% to 500% of the magnitude of the minimum value (352).

13. The control gear (90) according to claim 11, wherein the controller (92) is configured to switch the first switch (111, 211) and the second switch (112, 212) between the conductive state (381) and the non-conductive state (382) on the basis of a manipulated variable (502) of a control loop (500), wherein the manipulated variable (502) comprises a time duration (373) during which the first switch (111, 211) and the second switch (112, 212) are operated in the non-conductive state (382) in the third phase (363).

14. The control gear (90) according to claim 11, wherein a change in the average current flow through the DC-DC switching controller (100) causes a first change in the reference variable (509) with respect to the time duration during which the first switch (111, 112, 211, 212) and the second switch (111, 112, 211, 212) are operated in the third phase in the non-conductive state (382) along with a second change in the reference variable (509) with respect to the maximum value (351) of the current flow through the DC-DC switching controller (100) and the minimum value (352) of the current flow through the DC-DC switching controller.

15. The control gear (90) according to claim 14, wherein a ratio of the first change to the second change is determined as a function of a switching frequency of the first switch (111, 211), and of the second switch (112, 212).

16. The control gear (90) according to claim 11, wherein a reference variable (509) of the control loop (500) for average current flows (345) through the DC-DC switching controller (100) which are smaller than a predetermined threshold value (345A) specifies a minimum value of the current flow through the DC-DC switching controller (100) of substantially zero in the second phase.

17. The control gear (90) according to claim 11, wherein the current flow (181, 182) through the DC-DC switching controller (100) averaged across the first phase (361), the second phase (362) and the third phase (363) lies in the range from 80% to 120% of the current flow through the DC-DC switching controller (100) averaged only across the first phase (361) and the second phase (362).

18. The control gear (90) according to claim 11, furthermore comprising:

a measuring circuit (121, 221) configured to measure an electrical characteristic of the first switch (111, 211), wherein the controller (92) is configured to switch the first switch (111, 211) from the non-conductive state (382) in the third phase (363) to the conductive state (381) in the first phase (361) on the basis of the measured electrical characteristic.

19. A control gear (90) for an electrical load (130), comprising:

a DC-DC flyback converter (100) having a transformer (102), a first switch (111) arranged on a primary side of the transformer (102) and a second switch (112) arranged on a secondary side of the transformer (102);

a controller (92) configured to switch the second switch (112) on the basis of a manipulated variable (502) of a control loop (500), wherein the manipulated variable (502) comprises a time duration (372) for which the second switch (112) is operated in a conductive state (381);

a timer configured to provide a timer signal indicative of the time duration (372) for which the second switch is operated in the conductive state (381);

a switch driver configured to switch the second switch (112) between the conductive state (381) and a non-conductive state (382) on the basis of the timer signal; and a dithering source configured to provide a dithering signal, wherein the dithering signal causes a modulation (379) of the time duration, for which the second switch is operated in the conductive state (381), as the manipulated variable (502);

wherein the timer is configured to provide the timer signal on the basis of a clock signal (377) from a clock source; and further wherein the modulation, by the dithering signal, of the time duration for which the second switch is operated in the conductive state (381) lies in the range from 20% to 200% of a clock period (378) of the clock signal (377).

* * * * *